US012137068B2

(12) United States Patent
Cui et al.

(10) Patent No.: US 12,137,068 B2
(45) Date of Patent: Nov. 5, 2024

(54) METHODS AND APPARATUS FOR RADIO RESOURCE CONTROL BASED BANDWIDTH PARTS SWITCHING

(71) Applicant: Apple Inc., Cupertino, CA (US)

(72) Inventors: Jie Cui, Cupertino, CA (US); Dawei Zhang, Cupertino, CA (US); Haitong Sun, Cupertino, CA (US); Hong He, Cupertino, CA (US); Hongbo Yan, Cupertino, CA (US); Yang Tang, Cupertino, CA (US); Yushu Zhang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/598,216

(22) PCT Filed: Apr. 8, 2020

(86) PCT No.: PCT/CN2020/083794
§ 371 (c)(1),
(2) Date: Sep. 24, 2021

(87) PCT Pub. No.: WO2021/203311
PCT Pub. Date: Oct. 14, 2021

(65) Prior Publication Data
US 2023/0018496 A1 Jan. 19, 2023

(51) Int. Cl.
*H04L 5/00* (2006.01)
*H04W 72/0446* (2023.01)

(52) U.S. Cl.
CPC ....... *H04L 5/0098* (2013.01); *H04W 72/0446* (2013.01)

(58) Field of Classification Search
CPC ..................................................... H04L 5/0098
See application file for complete search history.

(56) References Cited

U.S. PATENT DOCUMENTS

| 2019/0104543 A1* | 4/2019 | Park ................... H04W 74/006 |
| 2019/0132110 A1 | 5/2019 | Zhou et al. |
| 2020/0100170 A1 | 3/2020 | Babaei et al. |

(Continued)

FOREIGN PATENT DOCUMENTS

| EP | 3629665 A1 | 4/2020 |
| WO | 2019/193402 A1 | 10/2019 |

OTHER PUBLICATIONS

CATT., "CR on RRC-based BWP switch delay", 3GPP TSG-RAN4 Meeting #90bis R4-1903215, Apr. 12, 2019.

(Continued)

*Primary Examiner* — Jason E Mattis
(74) *Attorney, Agent, or Firm* — Womble Bond Dickinson (US) LLP

(57) ABSTRACT

A method and apparatus of a device that switches bandwidth parts for a user equipment device and a base station is described. In an exemplary embodiment, the device receives an indication to switch to the bandwidth part for the user equipment on the wireless link from the base station. In addition, the device switches to the new bandwidth part for the user equipment. The device further signals that the switching to the new bandwidth part has occurred in a time period smaller than a predefined time period. The deice additionally communicates information on the wireless link using the new bandwidth part.

20 Claims, 14 Drawing Sheets

(56) References Cited

U.S. PATENT DOCUMENTS

| | | | |
|---|---|---|---|
| 2020/0107323 A1 | 4/2020 | Zhang et al. | |
| 2020/0351738 A1* | 11/2020 | Huang | H04W 36/06 |
| 2021/0392651 A1* | 12/2021 | Futaki | H04W 72/23 |
| 2023/0217500 A1* | 7/2023 | Loehr | H04W 28/0278 |
| | | | 370/329 |

OTHER PUBLICATIONS

International Preliminary Report on Patentability received for PCT Patent Application No. PCT/CN2020/083794, mailed on Oct. 20, 2022, 5 pages.

International Search Report and Written Opinion received for PCT Patent Application No. PCT/CN2020/083794, mailed on Jan. 4, 2021, 6 pages.

Mediatek Inc., "Remaining Details on Bandwidth Part Operation in NR", 3GPP TSG RAN WGI Meeting AH 1801 R1-1800148, Jan. 26, 2018, the whole document.

Nokia, et al., "On Active BWP switch delay in NR-U", 3GPP Draft, R4-1914180, vol. RAN WG4, No. Reno, Nov. 8, 2019.

Qualcomm Incorporated, "Remaining Issues on BWP", 3GPP TSG RAN WGI Meeting #92 R1-1802844, Mar. 2, 2018, the whole document.

Supplementary European Search Report and Search Opinion received for European Application No. 20930034.2, mailed on Nov. 16, 2023, 13 pages.

\* cited by examiner

US 12,137,068 B2

METHODS AND APPARATUS FOR RADIO RESOURCE CONTROL BASED BANDWIDTH PARTS SWITCHING

RELATED APPLICATIONS

The present application is the national phase of International Application No. PCT/CN2020/083794, filed on Apr. 8, 2020 and the disclosure of which is hereby incorporated herein by reference in its entirety.

FIELD OF INVENTION

This invention relates generally to wireless technology and more particularly to switching bandwidth parts using a radio resource control.

BACKGROUND OF THE INVENTION

In 5G New Radio (NR), a new feature is available known as bandwidth parts (BWPs), which enables more flexibility in how resources are assigned in a given carrier. Bandwidth parts can be used to provide flexibility so that multiple, different signal types can be sent in a given bandwidth. Some base stations can utilize the wider bandwidths available in 5G. User equipment (UE) capabilities, however, will vary and it will be more challenging for some UEs to use the larger available bandwidths. Bandwidth parts can further enable multiplexing of different signals and signal types for better utilization and adaptation of spectrum and UE power.

In addition, a 5G network can switch which BWP is used on a wireless link between a base station and the UE. This switch over can occur in a predefined time period governed by the radio resource control (RRC) of the UE and the BWP switching delay of the UE. At the end of this time period, the network and the UE are ready to communicate data using a 5G wireless link with the new BWP. A problem that can occur is that the UE may have completed the switch over to the new BWP prior to the predefined time period, where the UE is ready to communicate data using the new BWP. This can cause an inefficiency in the network for the BWP switchover.

SUMMARY OF THE DESCRIPTION

A method and apparatus of a device that switches bandwidth parts for a user equipment device and a base station is described. In an exemplary embodiment, the device receives an indication to switch to the bandwidth part for the user equipment on the wireless link from the base station. In addition, the device switches to the new bandwidth part for the user equipment. The device further signals that the switching to the new bandwidth part has occurred in a time period smaller than a predefined time period. The deice additionally communicates information on the wireless link using the new bandwidth part.

In further embodiments, a non-transitory machine-readable medium having executable instructions to cause one or more processing units to perform a method to switch to a new bandwidth part on a wireless link between a user equipment and a base station is described. In an exemplary embodiment, the method receives an indication to switch to the bandwidth part for the user equipment on the wireless link from the base station. In addition, the method switches to the new bandwidth part for the user equipment. The method further signals that the switching to the new bandwidth part has occurred in a time period smaller than a predefined time period. The method additionally communicates information on the wireless link using the new bandwidth part.

In some embodiments, the wireless link is a 5G wireless link and a bandwidth part is a subset of contiguous common physical resource blocks. In addition, the predefined time period can be at least based on a downlink slot of the wireless link. Furthermore, the predefined time period can be based on at least one of a radio resource control processing delay and a radio resource control switching delay. In other embodiments, the indication to switch is a radio resource control command. In addition, the method can further comprise transmitting uplink signals using an old bandwidth part until the user equipment sends a feedback signal and switching the user equipment to use the new bandwidth part for communicating signals using at least one of the uplink and downlink of the wireless link. The feedback signal can be a hybrid automatic repeat request feedback. Furthermore, the signaling can be a signaling that is one of a periodical sounding reference signal and a physical uplink control channel periodical channel quality information (CQI) reporting. The method further can switch the user equipment to use the new bandwidth part for communicating signals using at least one of the uplink and downlink of the wireless link.

In other embodiments, a non-transitory machine-readable medium having executable instructions to cause one or more processing units to perform a method to switch to a new bandwidth part on a wireless link between a user equipment and a base station is described. In an exemplary embodiment, the method sends an indication to switch to the bandwidth part for the user equipment on the wireless link from the base station. In addition, the method receives a response that the user equipment has switched to the new bandwidth part and communicates information on the wireless link using the new bandwidth part.

In addition, the method can further transmit signals on an old bandwidth part up until a first predefined period. The first predefined period can be $T_{HARQ}$. In addition, the base station may not schedule to communicate signals with the user equipment after the first predefined period and schedules to communicate signals with the user equipment after a second time period. The method can further monitor for a specific uplink signal from the user equipment, where the specific uplink signal is one of a periodical sounding reference signal and a physical uplink control channel periodical channel quality information (CQI) reporting. In addition, the response is a random access channel response.

In further embodiments, method to switch to a new bandwidth part on a wireless link between a user equipment and a base station is described. In an exemplary embodiment, the method receives an indication to switch to the bandwidth part for the user equipment on the wireless link from the base station. In addition, the method switches to the new bandwidth part for the user equipment. The method further signals that the switching to the new bandwidth part has occurred in a time period smaller than a predefined time period. The method additionally communicates information on the wireless link using the new bandwidth part.

In other embodiments, a method to switch to a new bandwidth part on a wireless link between a user equipment and a base station is described. In an exemplary embodiment, the method sends an indication to switch to the bandwidth part for the user equipment on the wireless link from the base station. In addition, the method receives a response that the user equipment has switched to the new bandwidth part and communicates information on the wireless link using the new bandwidth part.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
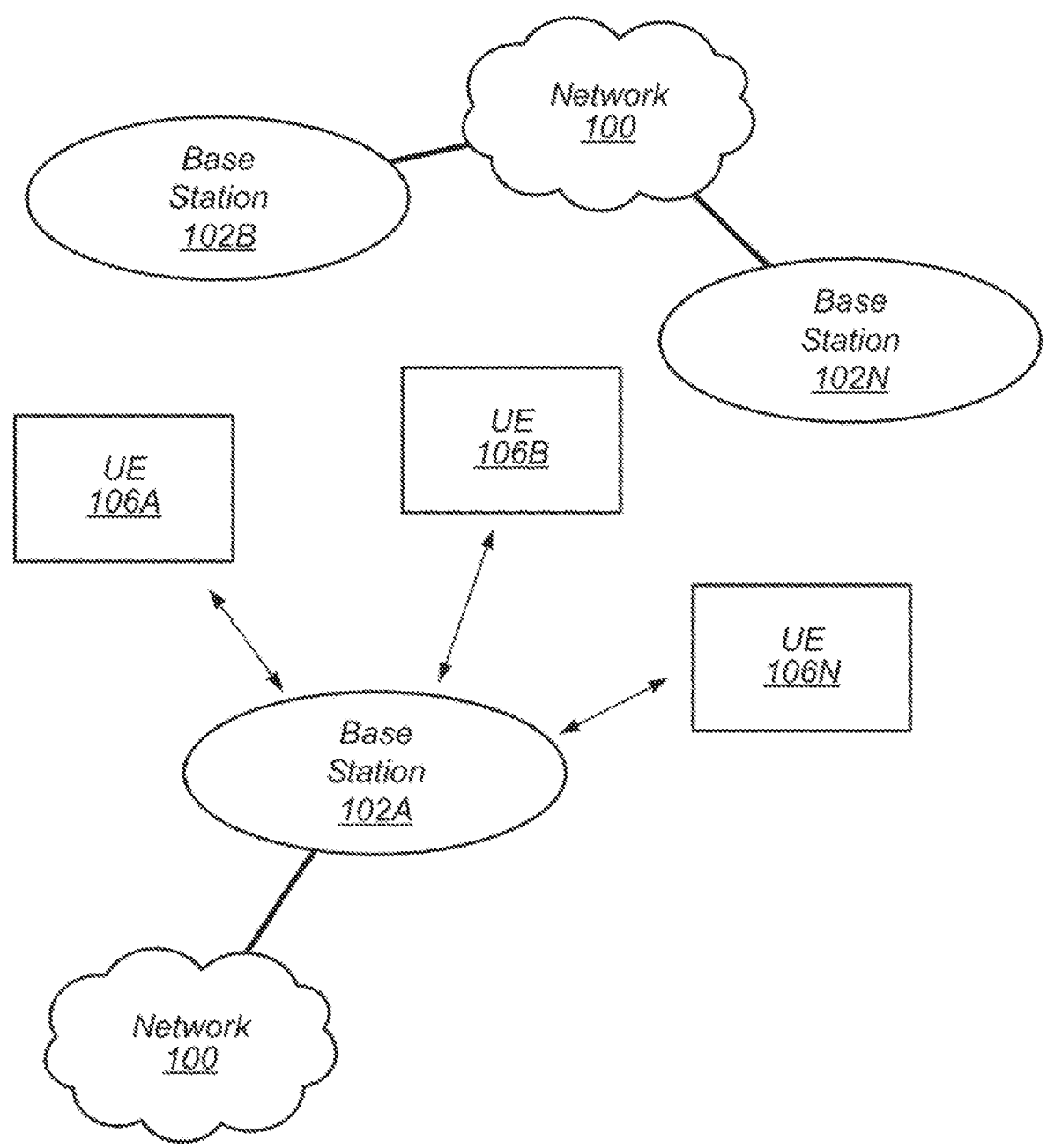
FIG. 1 illustrates an example wireless communication system according to some embodiments.

A method and apparatus of a device that switches bandwidth parts for a user equipment device and a base station is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" means that a particular feature, structure, or characteristic described in connection with the embodiment can be included in at least one embodiment of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that switches bandwidth parts (BWP) for a user equipment (UE) device and a base station in a wireless network is described. In some embodiments, a network (e.g., a base station) indicates to the UE to use a new BWP to communicate data on a wireless (e.g., a 5G wireless link). The network can initiate the switch to the new BWP and can be done for a variety of reasons (e.g., load balance among multiple UEs, switching a UE to a wide BWP for high data rate traffic, and/or other reasons that a network may have to manage a bandwidth of the network). In these embodiments, the network can initiate a BWP switch by using a radio resource control (RRC) signaling mechanism that indicates to the UE to switch to a new BWP. The UE receives the indication and UE begins to switch over to the new BWP. During the switchover time, the UE can receive and transmit data with the network using the old BWP.

Once the UE completes the switchover to the new UE, the UE is capable of receiving and transmitting on the new BWP. The network, however, does not start communicating data on the new BWP until after a predefined time period that is governed by a UE RRC processing delay and a UE MWP switching delay. This predefined period can be larger than the actual time period needed by the UE to switch over to the new BWP, which can cause an inefficiency in the network usage. In some embodiments, once the UE completes the BWP switch over to the new BWP, the UE signals to the network that the UE is ready to communicate data on the new BWP. In some embodiments, this signaling can be accomplished using a predefined uplink (UL) signal (e.g., periodical sounding reference signal (SRS), physical uplink control channel (PUCCH) carried periodical channel quality information (CQI) reporting, and/or or types of signaling) or can be via a random access channel (RACH). In these embodiments, by the UE using a signaling mechanism to indicate to the network that the UE switch over to the new BWP, the switch over time to the new BWP can be reduced and the efficiency of the network can be increased.

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, 1xEV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1xRTT, 1xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
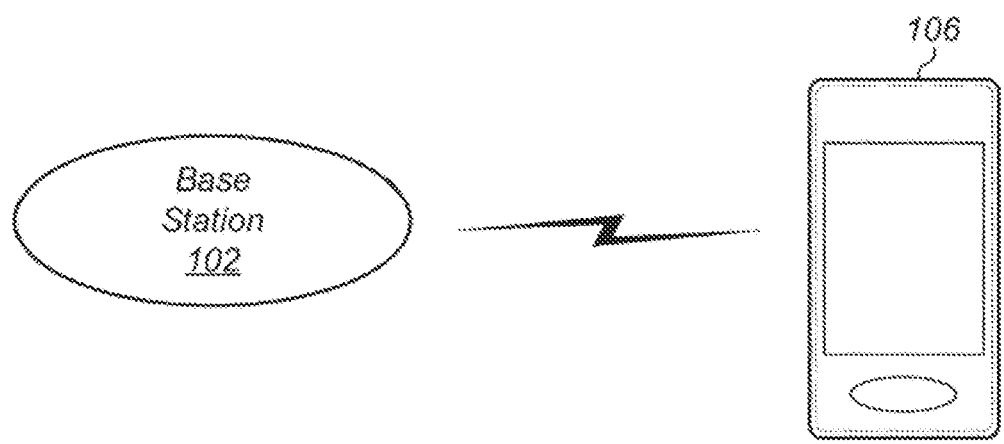
FIG. 2 illustrates a base station (BS) in communication with a user equipment (UE) device according to some embodiments.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1xRTTor LTE or GSM), and separate radios for communicating using each of Wi-Fi and Bluetooth. Other configurations are also possible.

Figure 3:
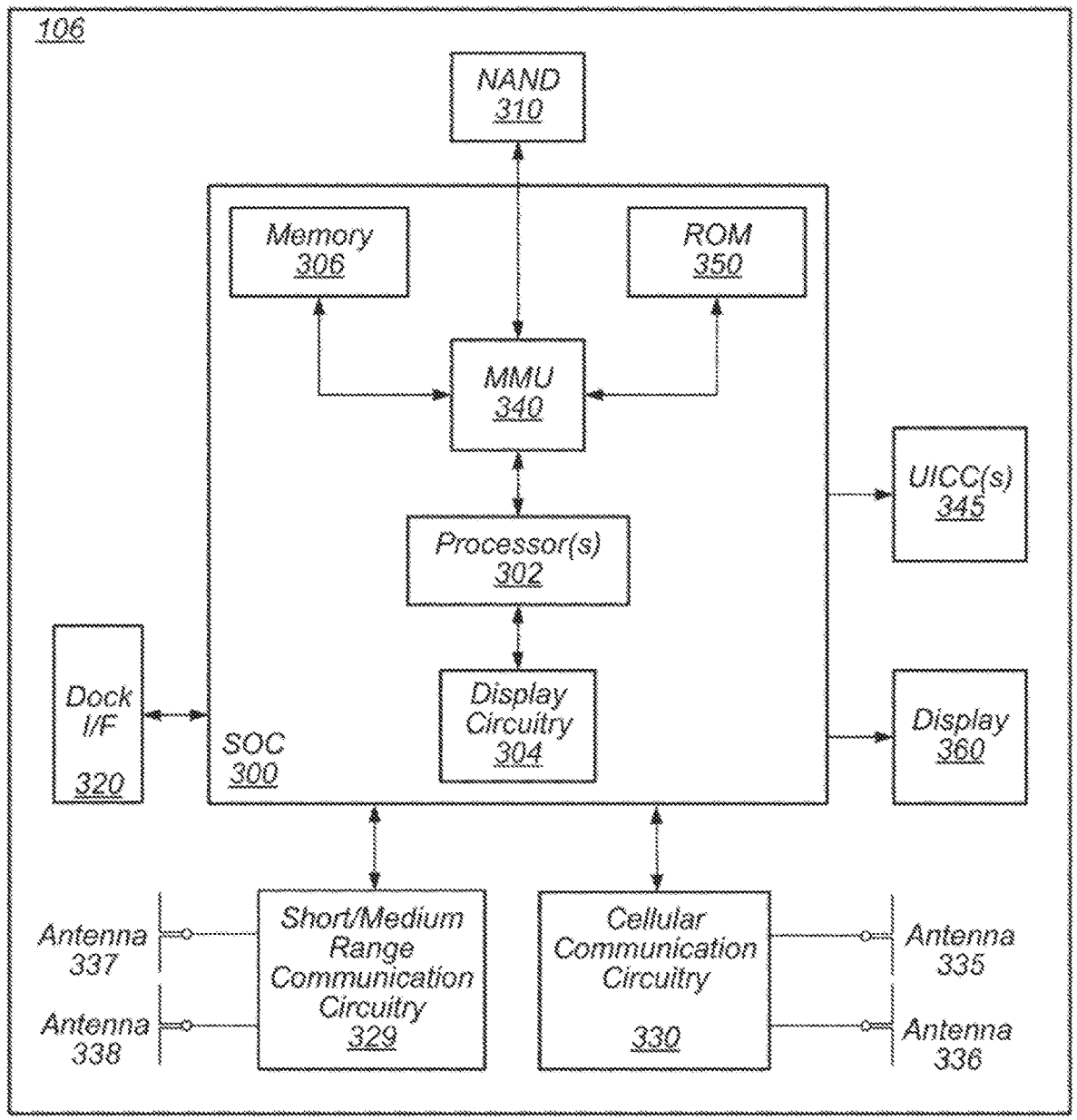
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector IF 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple radio access technologies (RATs) (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector IF 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may also be configured to determine a physical downlink shared channel scheduling resource for a user equipment device and a base station. Further, the communication device 106 may be configured to group and select CCs from the wireless link and determine a virtual CC from the group of selected CCs. The wireless device may also be configured to perform a physical downlink resource mapping based on an aggregate resource matching patterns of groups of CCs.

As described herein, the communication device 106 may include hardware and software components for implementing the above features for determining a physical downlink shared channel scheduling resource for a communications device 106 and a base station. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
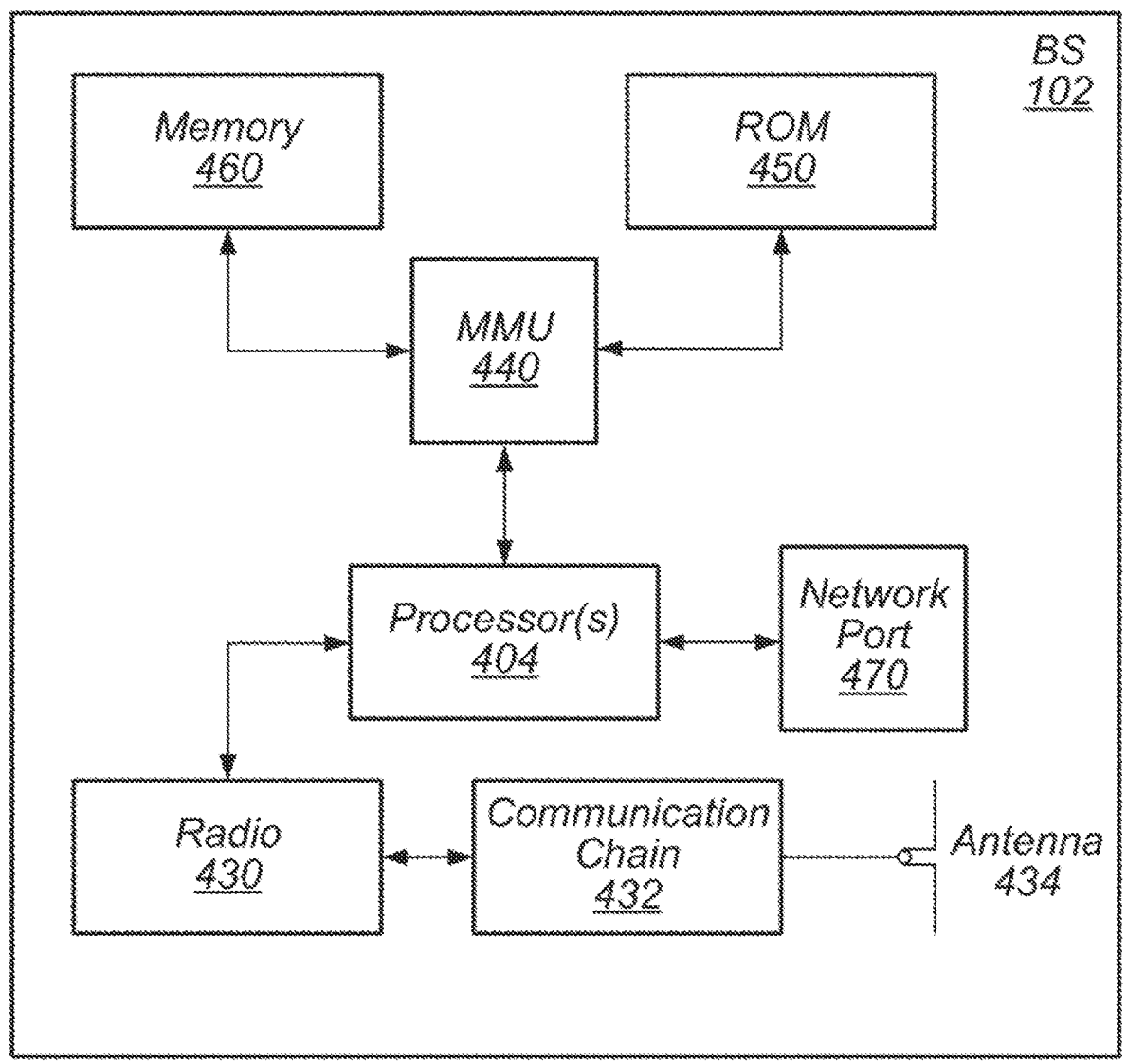
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
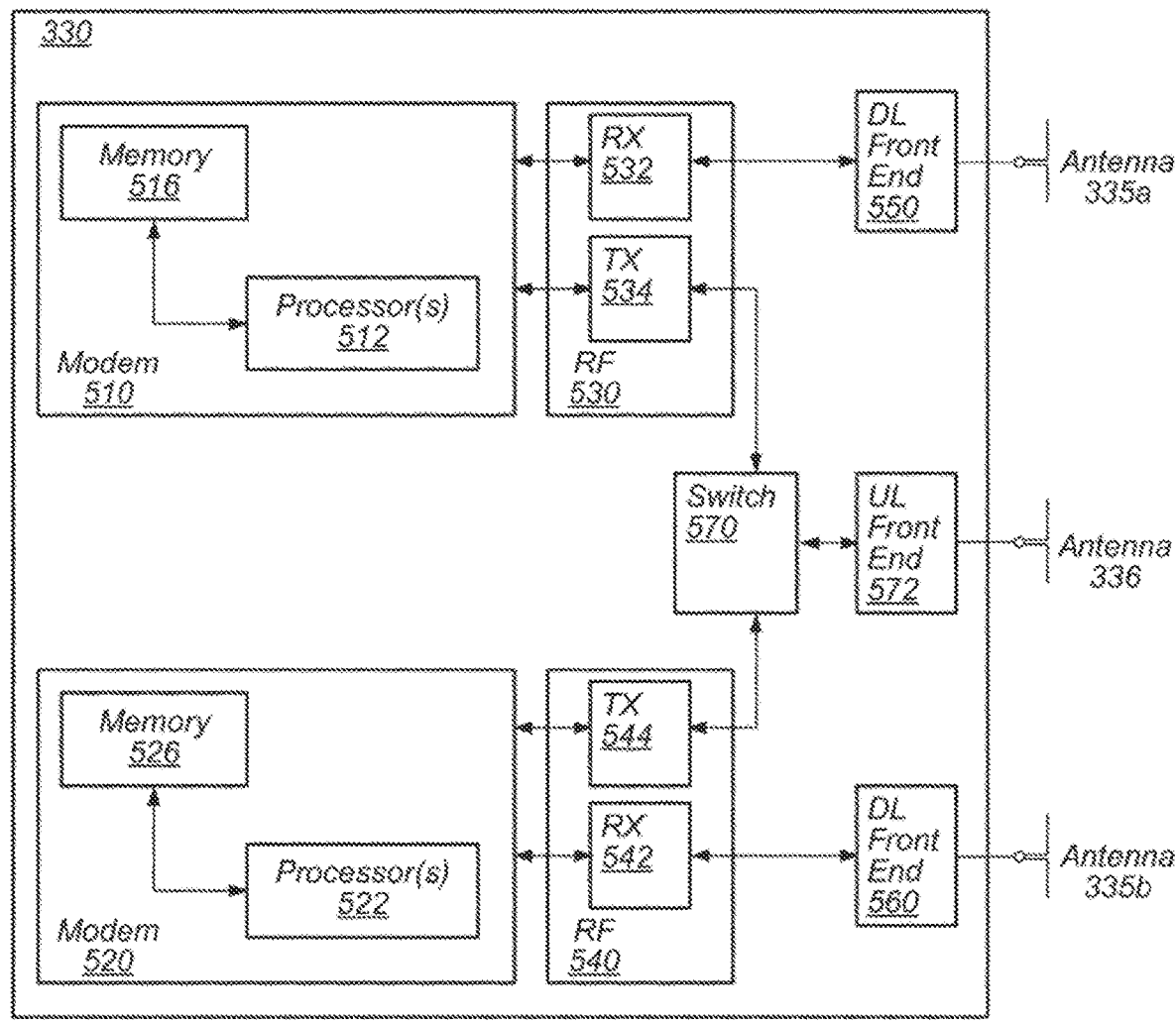
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for switching a bandwidth part for a user equipment device and a base station, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for switching bandwidth parts on a wireless link between a UE and a base station, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

In some embodiments, a radio resource control (RRC) based bandwidth parts (BWP) switch delay requirement is described in the RAN4 TS38.133 standard. In some embodiments, a bandwidth part is a subset of contiguous common physical resource blocks (PRBs). A UE can be configured with up to four BWPs in the uplink or four BWPs in the downlink. An additional four BWPs can be configured in a supplementary uplink. In these embodiments, a BWP in the UL and a BWP in the DL can be active at a given time. In addition, the network (e.g., a base station) can switch the UL or DL BWP for UE while the wireless link between the UE and the base station is active.

Figure 6:
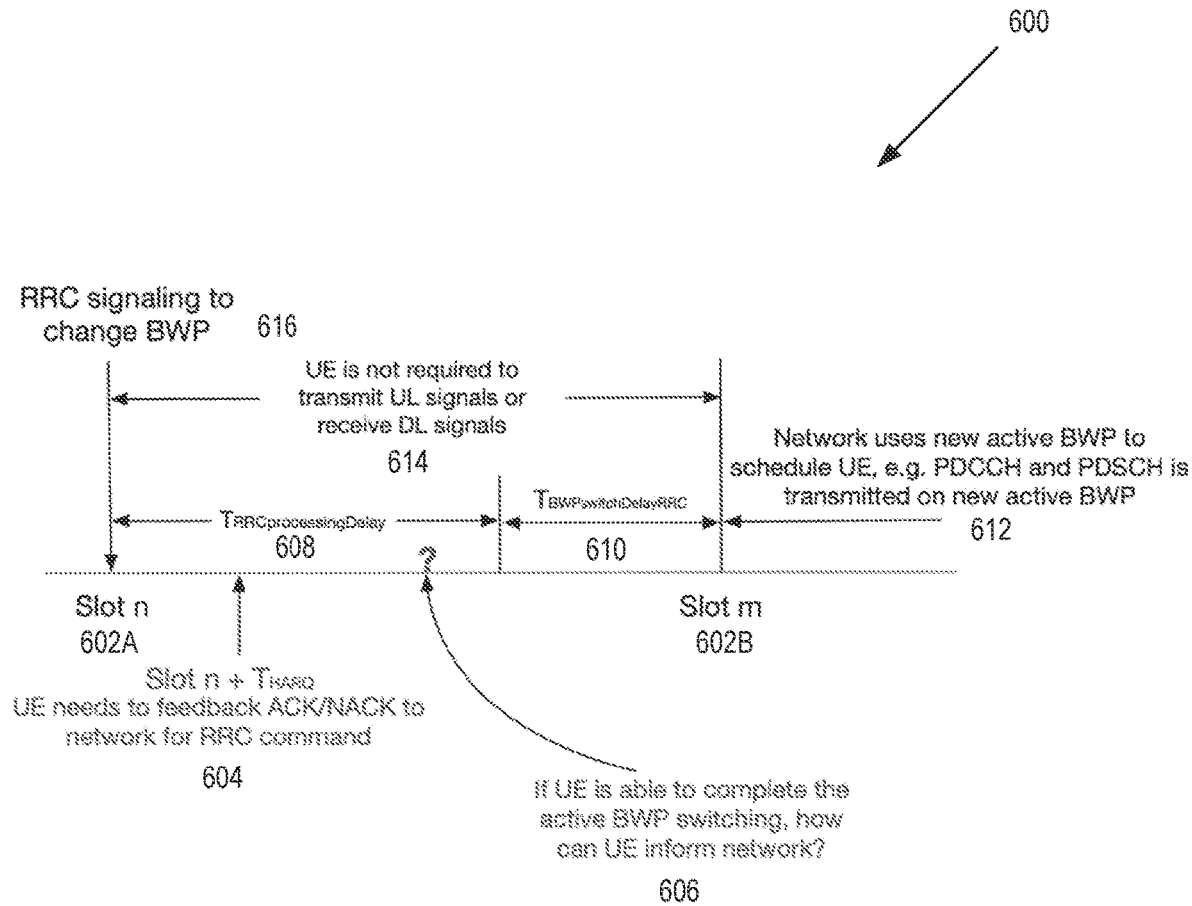
FIG. 6 is an illustration of some embodiments of bandwidth parts (BWP) switching.

In these embodiments, for a RRC-based BWP switch, after the UE receives RRC reconfiguration involving active BWP switching or parameter change of its active BWP, the UE can be able to receive physical downlink shared channel (PDSCH)/physical downlink control channel (PDCCH) (for a DL active BWP switch) or transmit physical uplink shared channel (PUSCH) (for UL active BWP switch). This can be for the new BWP on the serving cell on which BWP switch occurs on the first DL or UL slot right after the beginning of $$DL \text{ slot } n + \frac{T_{RRCprocesingdelay} + T_{BWPswitchDelayRRC}}{NR \text{ Slot Length}},$$

where DL Slot n is the last slot containing the RRC command, $T_{RRCprocessingdelay}$ is the length of the RRC procedure delay in millisecond as defined in clause 12 in TS 38.33, and $T_{BWPswitchDelayRRC}$ is the time used by the UE to perform a BWP switch. In addition, the UE is not required to transmit UL signals or receive DL signals during the time defined by $T_{RRCprocessingdelay} + T_{BWPswitchDelayRRC}$ on the cell where RRC-based BWP switch occurs. FIG. 6 is an illustration of some embodiments of bandwidth parts (BWP) switching 600. In FIG. 6, timeline 618 includes slots n 602A and m 602B. In some embodiments, a slot is a basic time unit in the NR system (e.g., in 15 kHz 1 slot=1 ms; in 30 kHz 1 slot=0.5 ms, in 60 kHz 1 slot=0.25 ms, in 120 kHz 1 slot=0.125 ms, etc.). At slot n 602A, the base station signals using an RRC signal 616 to change BWP. In some embodiments, this BWP can be a change for an UL and/or DL BWP change. In these embodiments, the UE is not required to transmit UL signals or receive DL signals during the time 614 defined by $T_{RRCprocessingdelay}+T_{BWPswitchDelayRRC}$ on the cell where RRC-based BWP switch occurs. In some embodiments, this time period is defined by a RRC processing delay ($T_{RRCprocessingdelay}$) 608 that is the time it takes for the UE to process the RRC command and a BWP switching delay ($T_{BWPswitchDelayRRc}$) 610 for the UE. After this delay, the UE and base station each can use the new active BWP 612 (e.g., transmitting PDCCH and PDSCH on the new active BWP).

In some embodiments, two potential issue can arise. One issue is that the UE is not required to transmit UL signals or receive DL signals during the time defined by $T_{RRCprocessmgdelay}+T_{BWPswitchDelayRRC}$ on the cell where RRC-based BWP switch occurs. However, on slot $n+T_{HARQ}$, a UE needs to send a feedback ACK/NACK to network for the received RRC command 604. In these embodiments, $T_{HARQ}$ is the timing between DL data transmission (RRC command of active BWP switching) and acknowledgement. A second issue can arise where the total delay for RRC based active BWP switching could be, e.g. 16 ms. If the UE can complete the active BWP switching earlier than n+16, it's useful to introduce an approach to indicate network such information from UE 606.

In some embodiments, and from the UE perspective, during RRC based active BWP switching, the UE will keep transmitting UL signals and receiving DL signals on the old active BWP until it sends a HARQ feedback to network (e.g., the base station), where this hybrid automatic repeat request (HARQ) feedback is feedback for the RRC command of active BWP switching. The UE will be able to transmit UL signals and receive DL signals on new active BWP after $$\text{slot } n + \frac{T_{RRCprocesingdelay} + T_{BWPswitchDelayRRC}}{NR \text{ Slot Length}}.$$

In addition, the UE may not transmit UL signals and receive DL signals on old active BWP after slot $n+T_{HARQ}$ until $$\text{slot } n + \frac{T_{RRCprocesingdelay} + T_{BWPswitchDelayRRC}}{NR \text{ Slot Length}}.$$

In some embodiments, $T_{HARQ}$ is the timing between DL data transmission (RRC command of active BWP switching) and acknowledgement.

Figure 7:
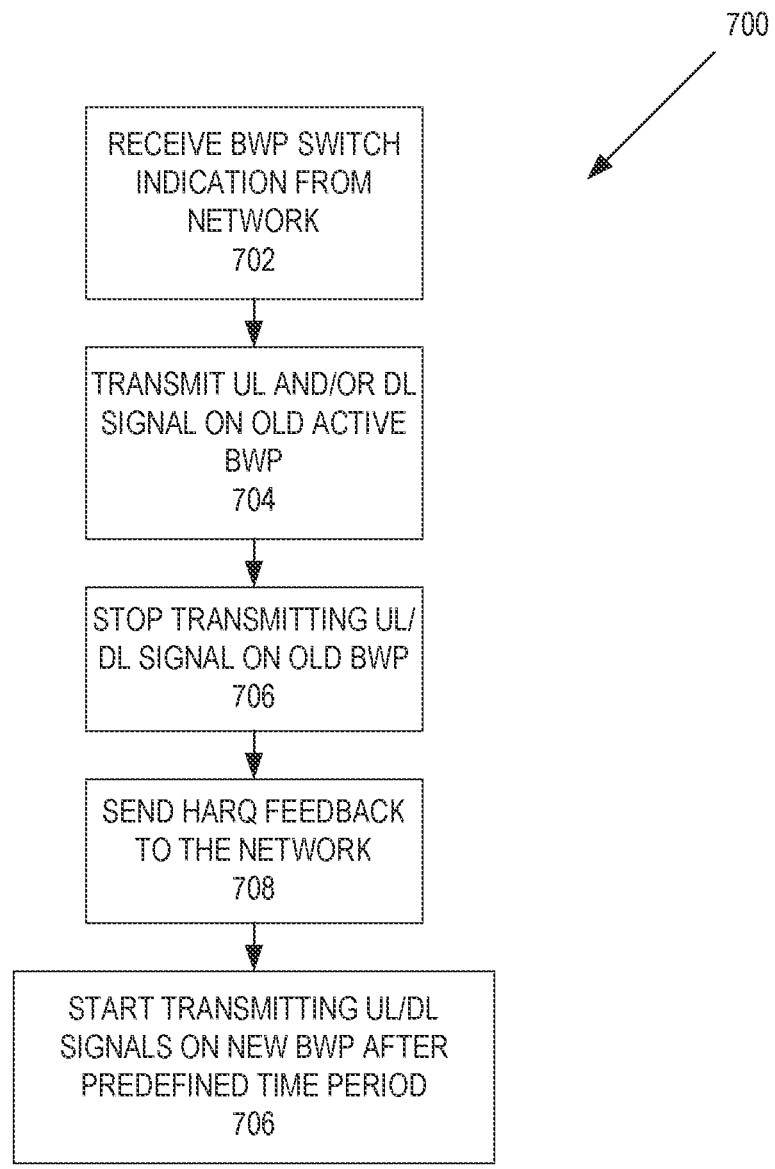
FIG. 7 is a flow diagram of some embodiments of a process to switch BWP on a UE using radio resource control (RRC).

FIG. 7 is a flow diagram of some embodiments of a process 700 to switch BWP on a UE using radio resource control (RRC). In FIG. 7, process 700 begins by receiving a BWP switch indication from the network at block 702. In some embodiments, the BWP switch indication can be a RRC command that indicates to the UE to switch BWP. At block 704, process 700 transmits UL and DL signals using the old active BWP. In some embodiments, the process 700 uses the old active BWP because the UE has not completed the switch over to the new active BWP. Process 700 stops transmitting UL/DL signals on the old BWP at block 706. In some embodiments, process 700 stops this transmission as part of the switchover to the new BWP. At block 708, process 700 sends a HARQ feedback to the network. In some embodiments, the HARQ feedback is an acknowledgment to the network that the UE has received the BWP switch indication. Process 700 starts transmitting UL/DL signals on the new BWP after a predefined time period. In some embodiments, process 700 starts transmitting UL/DL signals after the time period $$\text{slot } n + \frac{T_{RRCprocesingdelay} + T_{BWPswitchDelayRRC}}{NR \text{ Slot Length}}.$$

Figure 8:
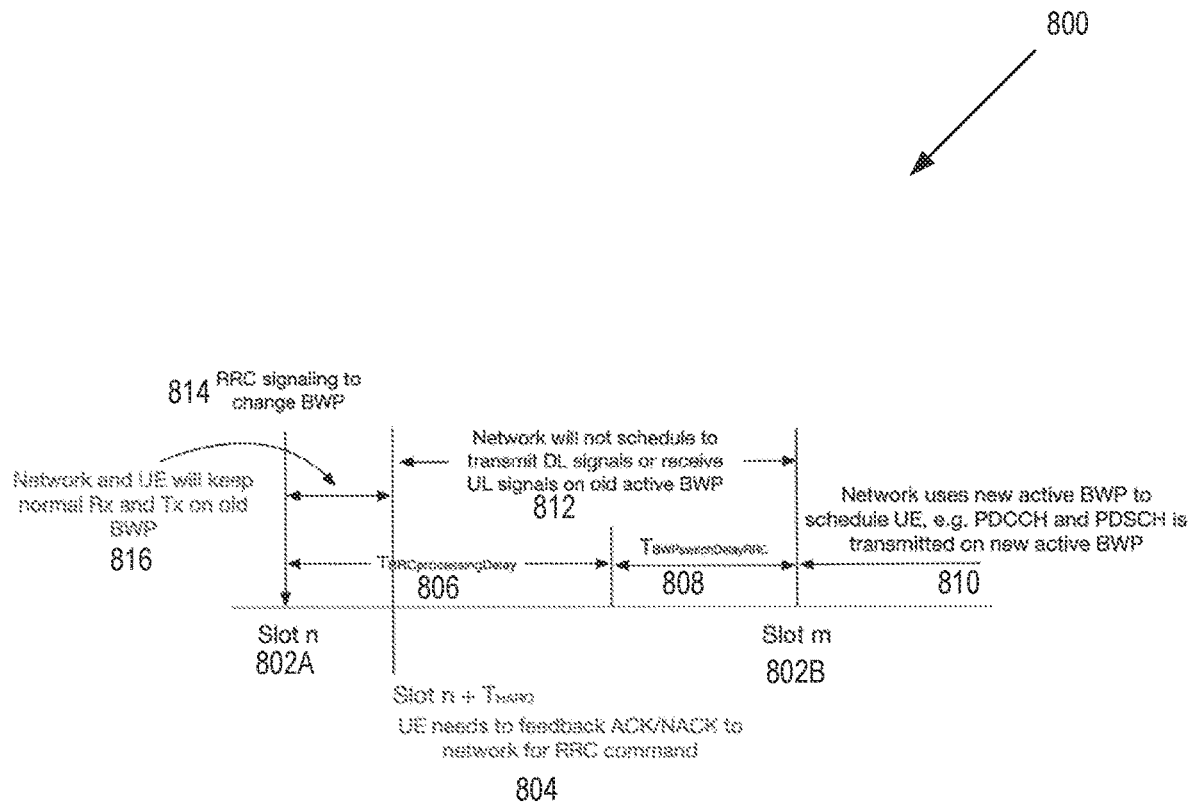
FIG. 8 is an illustration of some embodiments of BWP switching on a UE using RRC.

The problem here is that the UE may be ready to transmit UL/DL signals on the new BWP prior to the predefined time period. For example and in some embodiments, the UE may be ready to transmit UL/DL signals on the new BWP several microseconds before the predefined time periods ends. This leads to an inefficient use of the wireless link. FIG. 8 is an illustration of some embodiments of BWP switching 800 on a UE using RRC. In some embodiments, for the first issue, from a network perspective, during RRC based active BWP switching 814, the network will keep transmitting DL signals to this UE and receiving UL signals 816 from this UE on the old active BWP until receiving HARQ feedback from UE 804, and this HARQ feedback is for RRC command of active BWP switching. The network will schedule to transmit DL signals to UE and receive UL signals from UE on new active BWP after $$\text{slot } n + \frac{T_{RRCprocesingdelay} + T_{BWPswitchDelayRRC}}{NR \text{ Slot Length}}.$$

In addition, the network will not schedule to transmit DL signals to UE and receive UL signals from UE on old active BWP after slot $n+T_{HARQ}$ until after $$\text{slot } n + \frac{T_{RRCprocesingdelay} + T_{BWPswitchDelayRRC}}{NR \text{ Slot Length}} 812.$$

The network uses the new active BWP after the time period 810 to schedule the UE 810, such as transmitting PDCCH and/or PDSCH on the new active BWP. In these embodiments, DL slot n is the last slot containing the RRC command of active BWP switching. $T_{HARQ}$ is the timing between DL data transmission (RRC command of active BWP switching) and acknowledgement. In addition, $T_{RRCprocessingdelay}$ 806 is the RRC processing delay and $T_{BWPswitchDelayRRC}$ 808 is the BWP switching delay for the UE as described above.

For the second issue, and in some embodiments, there can be two potential solutions to the second issue. In some embodiments, from the network perspective, the network can configure specific UL signal transmission on new BWP when it configures UE to switch active BWP. In these embodiments, the specific UL signal can be but not limited to the following: periodical SRS (sounding), PUCCH carried periodical CQI reporting, and/or or types of signaling. In some embodiments, the network will keep monitoring the above UL signal after $n+T_{HARQ}$. In these embodiments, after the network received the above UL signal, network will determine that UE is ready to be scheduled on new BWP.

Figure 9:
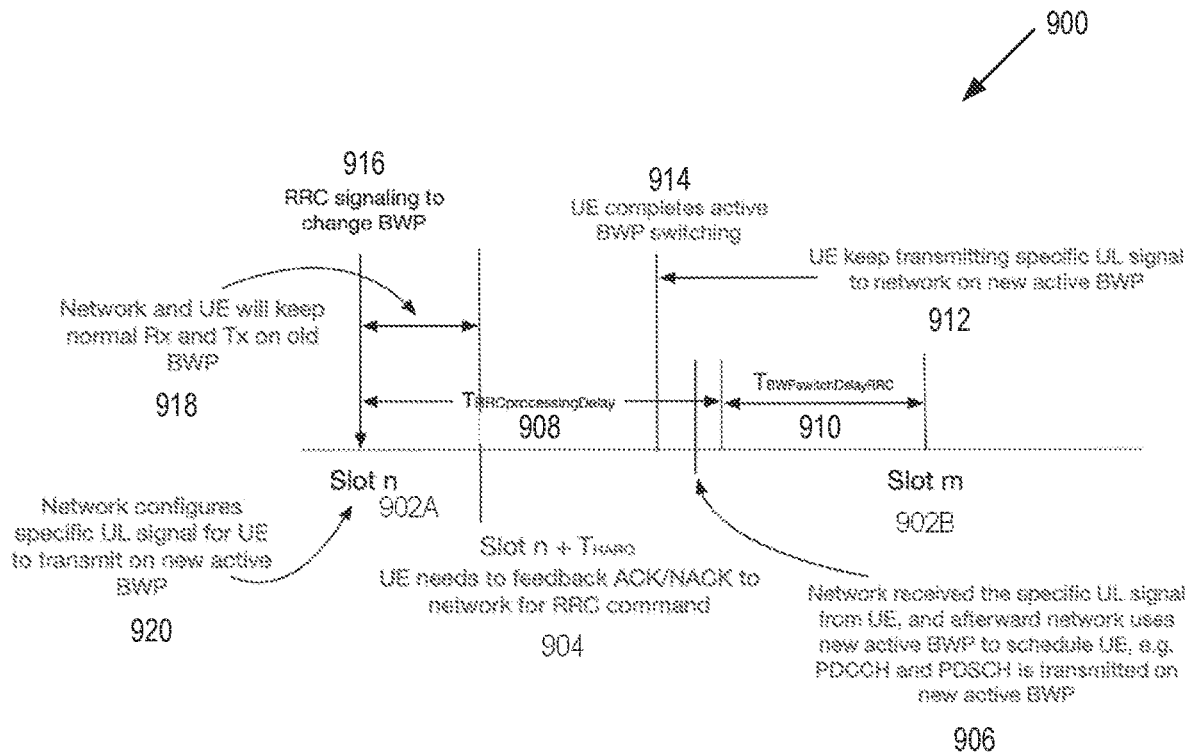
FIG. 9 is an illustration of some embodiments of BWP switching on a UE using RRC and a specific UL signal.

FIG. 9 is an illustration of some embodiments of BWP switching 900 on a UE using RRC and a specific UL signal. In FIG. 9, the network (e.g., a base station) signals using RRC to the UE to change to a new BWP 916 at slot n. In some embodiments, the timeline includes two different time slots, slot n 902A and slot m 902B. At the time of the RRC signaling, the network will continue receive and transmit data on the old BWP until the network receives an acknowledgement for the RRC signaling. For example and in some embodiments, at slot n+$T_{HARQ}$, the network can receive the ACK/NACK feedback from the UE for the RRC command to switch to the new BWP. In some embodiments, the UE can complete the active BWP switching 914 at a time less than $T_{RRCprocessmgdelay}$ 908+$T_{BWPswitchDelayRRC}$ 910. At this time, the UE transmits a specific UL signal to the network on the new active BWP 912. In these embodiments, the specific UL signal can be but not limited to the following: periodical SRS (sounding), PUCCH carried periodical CQI reporting, and/or or types of signaling. In some embodiments, the UE will keep transmitting the above UL signal after the UE is ready on new active BWP, which can be later than n+$T_{HARQ}$. In some embodiments, the UE will keep transmitting the above UL signal after the UE is ready on new active BWP, which can be later than n+$T_{HARQ}$. In addition, the DL slot n is the last slot containing the RRC command of active BWP switching and $T_{HARQ}$ is the timing between DL data transmission (RRC command of active BWP switching) and acknowledgement. In further embodiments, the network receives the specific UL signal 906 from the UE and the network use the new active BWP to schedule the UE for data (e.g., PDCCH and/or PDSCH are transmitted on the new active BWP).

Figure 10:
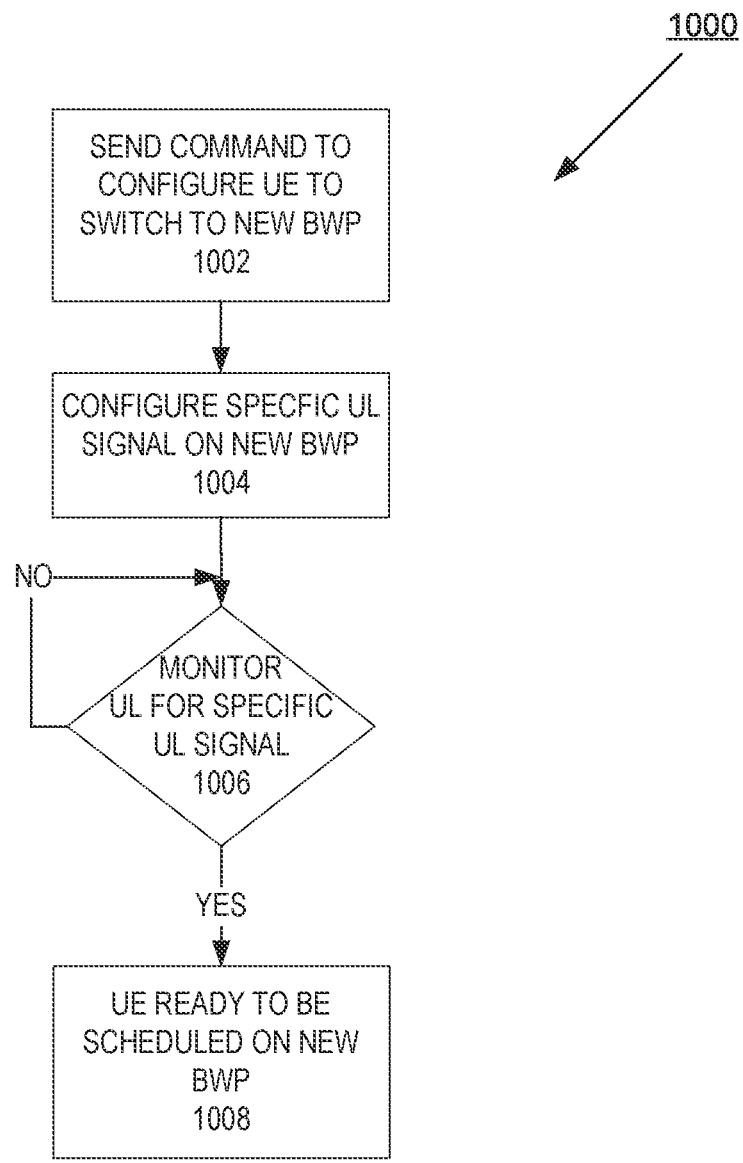
FIG. 10 is a flow diagram of some embodiments of a process to switch BWP in the network using RRC.

FIG. 10 is a flow diagram of some embodiments of a process 1000 to switch BWP in the network using RRC. In FIG. 10, process 1000 begins by sending a command to configure the UE to switch to the new BWP at block 1002. In some embodiments, process 1000 sends an RRC command to the UE that indicates to the UE to configure itself for the new BWP. In these embodiments, the command can include characteristics for the new BWP. Furthermore, the RRC command can include an indication of the specific UL signal to use. At block 1004, process 1000 configures the base station for a specific UL signal on the new BWP. In some embodiments, the specific UL signal can be but not limited to the following: periodical SRS (sounding), PUCCH carried periodical CQI reporting, and/or or types of signaling. Process 1000 monitors the UL for the specific UL signal at block 1006. If process 1000 receives the specific UL signal, execution proceeds to block 1008 below. If process 1000 does not receive the specific UL signal, process 1000 continues to monitor the UL at block 1006. At block 1008, process 1000 the UE is ready to be scheduled on the new BWP. In some embodiments, the network can use the new BWP for communicating data with the UE.

Figure 11:
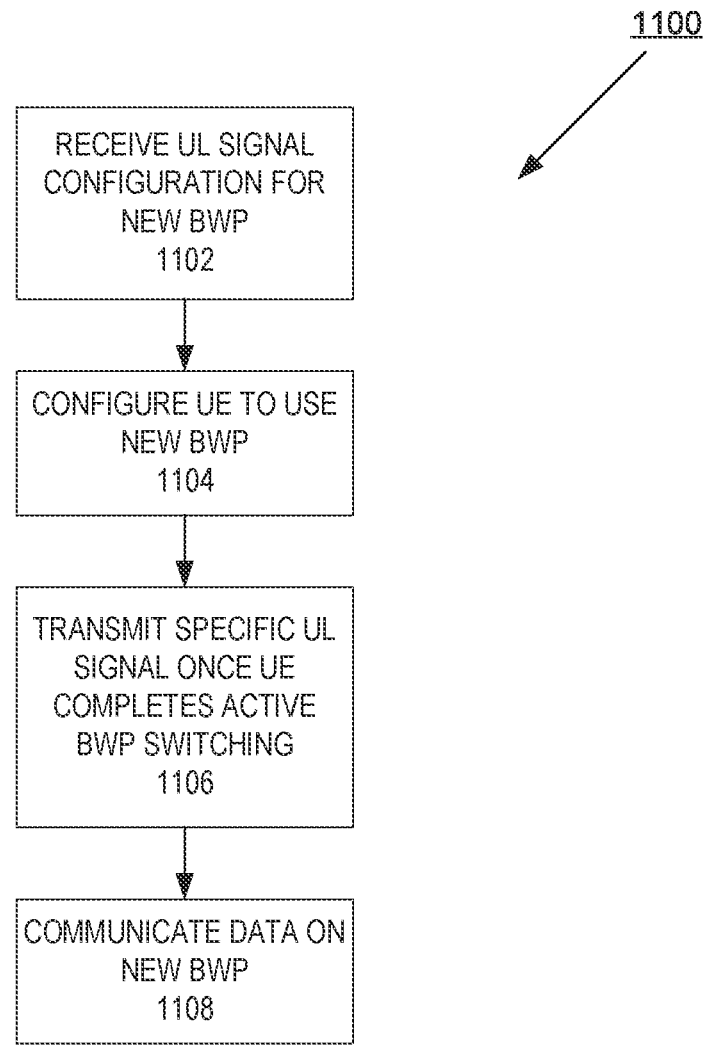
FIG. 11 is a flow diagram of some embodiments of a process to switch BWP on a UE using radio resource control (RRC) and a specific uplink (UL) signal.

FIG. 11 is a flow diagram of some embodiments of a process 1100 to switch BWP on a UE using RRC and a specific UL signal. In FIG. 11, process 1100 beings by receiving a UL signal configuration for a switch to a new BWP at block 1102. In some embodiments, the configuration can include the new BWP and an indication of a specific UL to use for signaling. At block 1104, process 1100 configures the UE for the new BWP. In some embodiments, process 1100 prepares the UE to transmit a UL signal on new BWP, once the BWP switching is completed, UE can transmit this UL signal on the new BWP. Process 1100 transmits the specific UL signal once the UE completes the switch to the new active BWP. In some embodiments, the specific UL signal can be but not limited to the following: periodical SRS (sounding), PUCCH carried periodical CQI reporting, and/or or types of signaling. With the new active BWP setup, process 1100 communicates data on the new BWP at block 1108.

Figure 12:
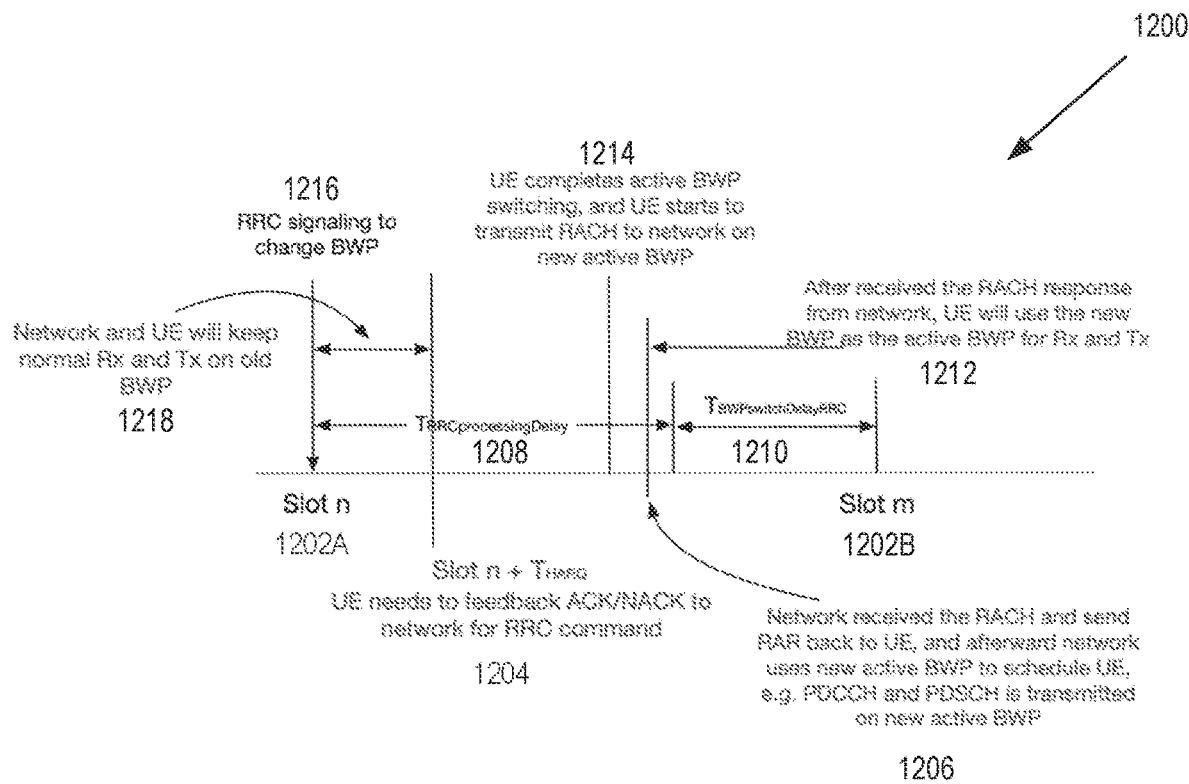
FIG. 12 is an illustration of some embodiments of BWP switching on a UE using a RACH.

In further embodiments, the network and the UE can use a random access channel (RACH) as a signaling mechanism to let the network know that the UE has configured itself to use the new BWP. FIG. 12 is an illustration of some embodiments of BWP switching 1200 on a UE using a RACH. In FIG. 12, the network (e.g., a base station) signals using RRC to the UE to change to a new BWP 1216 at time T. In some embodiments, the timeline includes two different time slots, slot n 1202A and slot m 1202B. At the time of the RRC signaling, the network will continue receive and transmit data on the old BWP 1218 until the network receives an acknowledgement for the RRC signaling. For example and in some embodiments, at slot n+$T_{HARQ}$, the network can receive the ACK/NACK feedback from the UE for the RRC command to switch to the new BWP. In some embodiments, the UE can complete the active BWP switching 1214 at a time less than $T_{RRCprocessmgdelay}$ 1208+$T_{BWPswitchDelayRRC}$ 1210. In some embodiments, from a UE perspective, during RRC based BWP switching, if the target active BWP has a RACH resource, the UE will transmit RACH to network on new active BWP once the UE completes the active BWP switching 1214. In these embodiments, the UE will keep transmitting the above RACH until it receives RACH response from network 1212. In addition, the RACH transmission on new active BWP can be later than n+$T_{HARQ}$. After received the RACH response from network 1212, the UE will use the new BWP as the active BWP for Rx and Tx.

In addition, and in some embodiments, from the network perspective for the second solution of the second issue, during RRC based BWP switching, network will keep monitoring RACH from the UE on the new active BWP after n+$T_{HARQ}$. In these embodiments, after network receives the RACH from UE, the network will response to UE 1206 (e.g., using a random access response, RAR). This response will be labelled with "for BWP switching." After the network sends the RACH response to UE 1212, the network will use the new BWP as the active BWP for Rx and Tx with this UE. Furthermore, the DL slot n is the last slot containing the RRC command of active BWP switching. $T_{HARQ}$ is the timing between DL data transmission (RRC command of active BWP switching) and acknowledgement.

Figure 13:
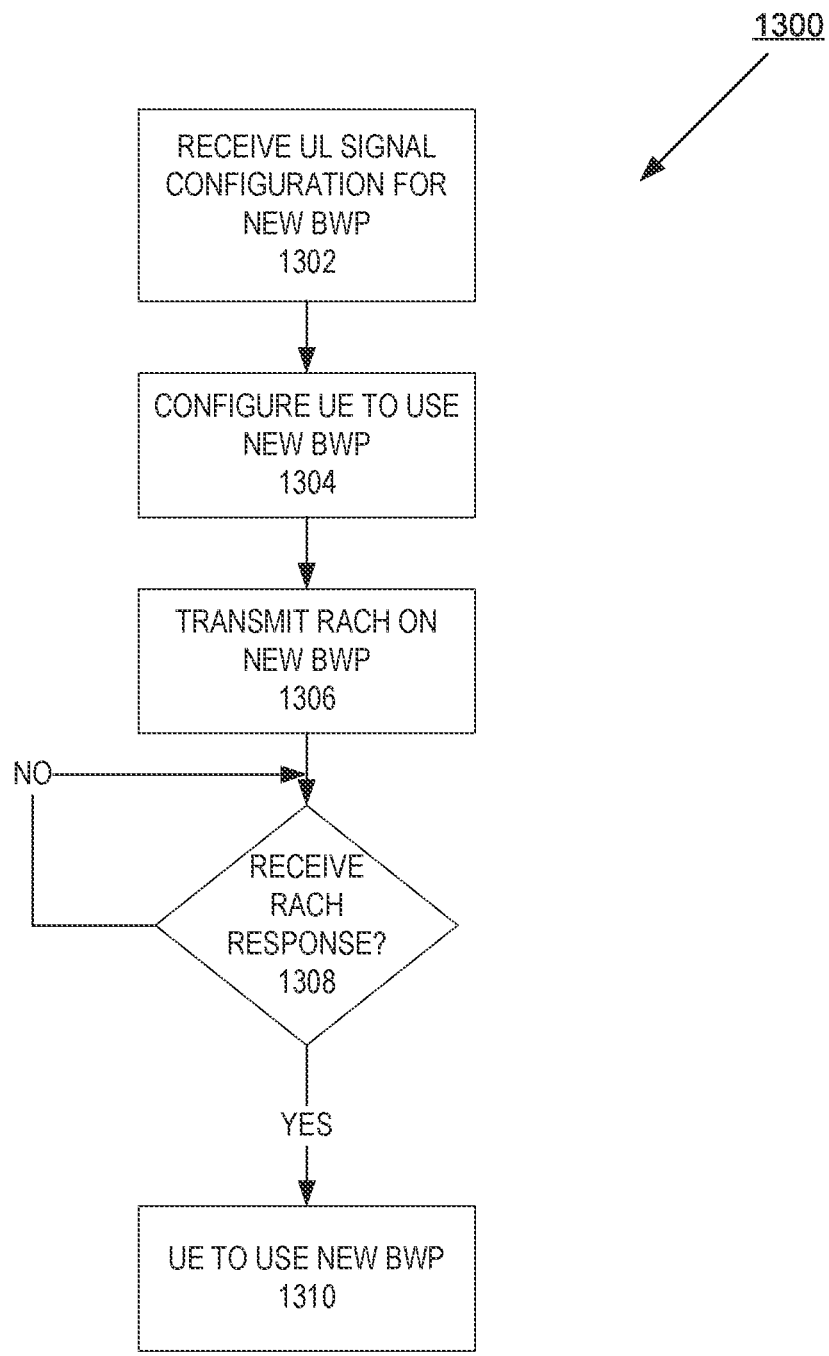
FIG. 13 is a flow diagram of some embodiments of a process to switch BWP in a UE using a random access channel (RACH).

FIG. 13 is a flow diagram of some embodiments of a process 1300 to switch BWP in a UE using a RACH. In FIG. 13, process 1300 begins by receiving a UL signal configuration for a new BWP and block 1302. In some embodiments, a RACH is a random access channel. In these embodiments, the UE will start to send a RACH to the network on new BWP after the UE completes the BWP switching, so as to let the network know that the UE has complete the BWP switching. The UE will stop sending the RACH after the UE receives the random access response from network to confirm that network received that RACH and knew that UE completed the BWP switching. In addition, the UL signal configuration includes the new BWP information for the UE to use. At block 1304, process 1300 configures the UE to use the new BWP. Process 1300 transmit a RACH on the new BWP. At block 1308, process 1300 determines if a RACH response has been received. In some embodiments, a base station sends a RACH response in response to receives a RACH form the UE. If process 1300 receives a RACH response, execution proceeds to block 1310, where process 1300 use the new BWP for the UE. If process 1300 does not receive a RACH response, execution proceeds to block 1308, where process continues to monitor for a RACH response.

Figure 14:
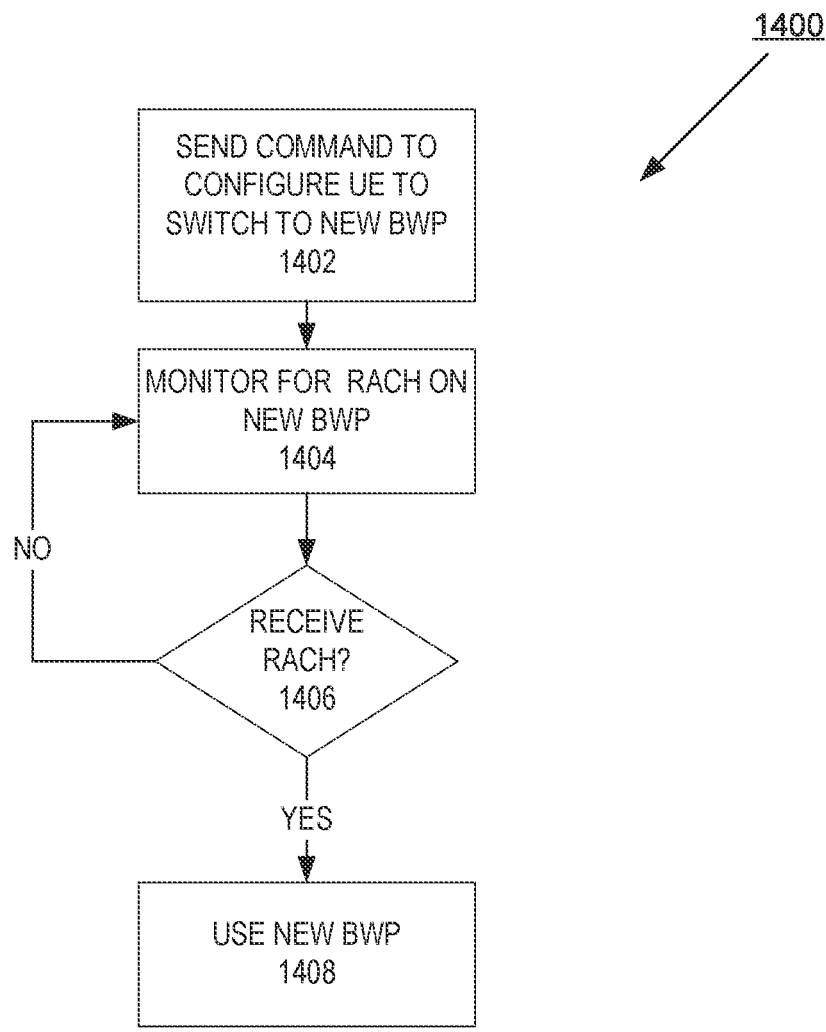
FIG. 14 is a flow diagram of some embodiments of a process to switch BWP in the network using a RACH.

FIG. 14 is a flow diagram of some embodiments of a process 1400 to switch BWP in the network using a RACH. In FIG. 14, process 1400 begins by sending a command to configure the UE to use the new BWP at block 1402. In some embodiments, process 1400 uses a RRC command to indicate to the UE to be configured for the new BWP. Process 1400 monitors for a RACH on the new BWP at block 1404. At block 1406, process 1400 determines if a RACH received. If a RACH was received, process 1400 uses the new BWP to communicate data with the UE at block 1408. If a RACH was not received, execution proceeds to block 1404 above.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "sending," "receiving," "switching," "receiving," "communicating," "transmitting," "aggregating," "monitoring," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to switch to a new bandwidth part on a wireless link between a user equipment and a base station, the method comprising:
   receiving an indication to switch to the new bandwidth part for the user equipment on the wireless link from the base station;
   switching to the new bandwidth part for the user equipment;
   signaling, to the base station, that the switching to the new bandwidth part has occurred in a time period smaller than a predefined time period, wherein the time period is determined using a time taken to send a feedback for the indication of the new bandwidth part switching; and communicating information on the wireless link using the new bandwidth part prior to the expiration of the predefined time period.

2. The non-transitory machine-readable medium of claim 1, wherein the wireless link is a 5G wireless link.

3. The non-transitory machine-readable medium of claim 1, wherein a bandwidth part is a subset of contiguous common physical resource blocks.

4. The non-transitory machine-readable medium of claim 1, wherein the predefined time period is at least based on a downlink slot of the wireless link.

5. The non-transitory machine-readable medium of claim 4, wherein the predefined time period is further based on at least one of a radio resource control processing delay and a radio resource control switching delay.

6. The non-transitory machine-readable medium of claim 1, wherein the indication to switch is a radio resource control command.

7. The non-transitory machine-readable medium of claim 1, further comprising:

transmitting uplink signals using an old bandwidth part until the user equipment sends a feedback signal.

8. The non-transitory machine-readable medium of claim 7, wherein the feedback signal is a hybrid automatic repeat request feedback.

9. The non-transitory machine-readable medium of claim 1, wherein the switching comprises:

switching the user equipment to use the new bandwidth part for communicating signals using at least one of an uplink and downlink of the wireless link.

10. The non-transitory machine-readable medium of claim 1, wherein the signaling uses a signaling that is one of a periodical sounding reference signal and a physical uplink control channel periodical channel quality information (CQI) reporting.

11. The non-transitory machine-readable medium of claim 1, wherein the signaling comprises:

periodically transmitting a random access channel signal to the base station until a random access channel response is received.

12. A non-transitory machine-readable medium having executable instructions to cause one or more processing units to perform a method to switch to a new bandwidth part on a wireless link between a user equipment and a base station, the method comprising:

sending an indication to switch to the new bandwidth part for the user equipment on the wireless link from the base station;

receiving a response that the user equipment has switched to the new bandwidth part, wherein the response is sent by the user equipment is a feedback for the indication of the new bandwidth part switching, the response is sent by the user equipment in a time period that is less than a predefined time period, and the time period is determined using a time taken by the user equipment to send the feedback; and communicating information on the wireless link using the new bandwidth part.

13. The non-transitory machine-readable medium of claim 12, further comprising: transmitting signals on an old bandwidth part up until a first predefined period.

14. The non-transitory machine-readable medium of claim 13, wherein the first predefined period is $T_{HARQ}$.

15. The non-transitory machine-readable medium of claim 13, wherein the base station does not schedule to communicate signals with the user equipment after the first predefined period and schedules to communicate signals with the user equipment on new bandwidth part after a second time period.

16. The non-transitory machine-readable medium of claim 12, further comprising: monitoring for a specific uplink signal from the user equipment.

17. The non-transitory machine-readable medium of claim 16, wherein the specific uplink signal that is one of a periodical sounding reference signal and a physical uplink control channel periodical channel quality information (CQI) reporting.

18. The non-transitory machine-readable medium of claim 1, wherein a response is a random access channel response.

19. A method to switch to a new bandwidth part on a wireless link between a user equipment and a base station, the method comprising:

receiving an indication to switch to the new bandwidth part for the user equipment on the wireless link from the base station;

switching to the new bandwidth part for the user equipment;

signaling, to the base station, that the switching to the new bandwidth part has occurred in a time period smaller than a predefined time period, wherein the time period is determined using a time taken to send a feedback for the indication of the new bandwidth part switching; and communicating information on the wireless link using the new bandwidth part prior to the expiration of the predefined time period.

20. A method to switch to a new bandwidth part on a wireless link between a user equipment and a base station, the method comprising:

sending an indication to switch to the new bandwidth part for the user equipment on the wireless link from the base station;

receiving a response that the user equipment has switched to the new bandwidth part, wherein the response is sent by the user equipment is a feedback for the indication of the new bandwidth part switching, the response is sent by the user equipment in a time period that is less than a predefined time period, and the time period is determined using a time taken by the user equipment to send the feedback; and communicating information on the wireless link using the new bandwidth part.

* * * * *